Aug. 5, 1952  J. H. GRUVER  2,605,878
EMBOSSING MACHINE
Filed Sept. 13, 1949  8 Sheets-Sheet 6
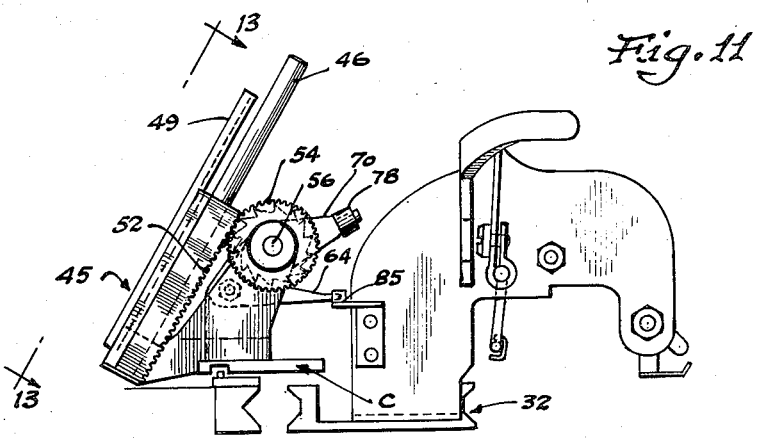
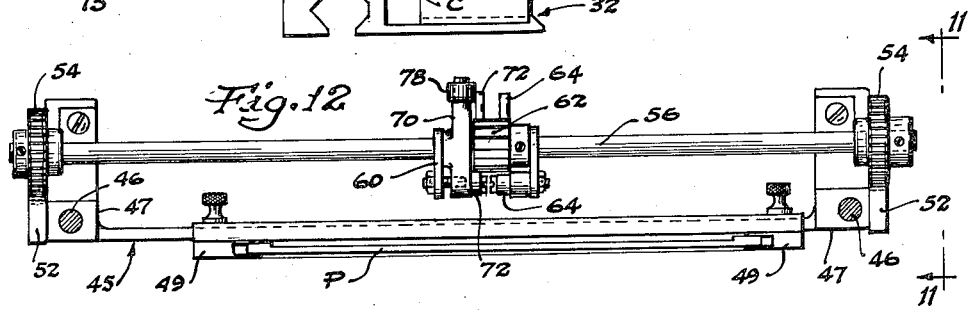
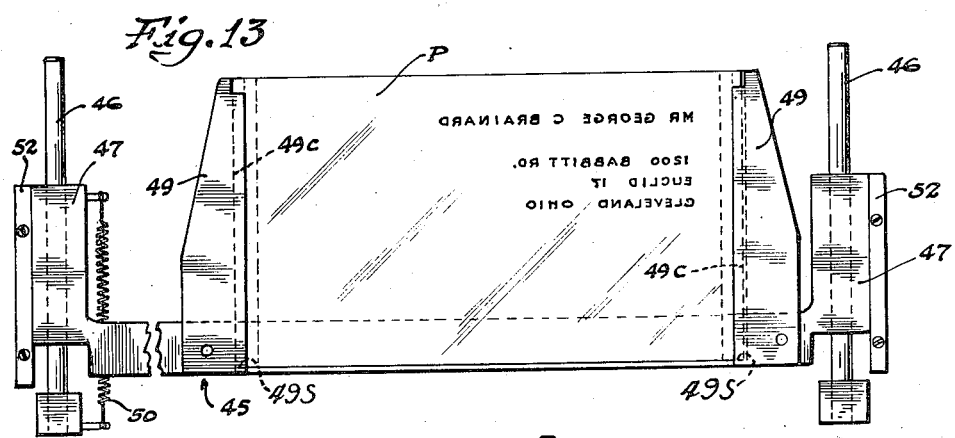
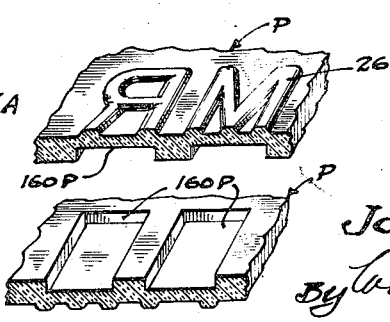
Inventor
John H. Gruver
By Wallace and Cannon
Attorneys Aug. 5, 1952
J. H. GRUVER
2,605,878
EMBOSSING MACHINE
Filed Sept. 13, 1949
8 Sheets-Sheet 7
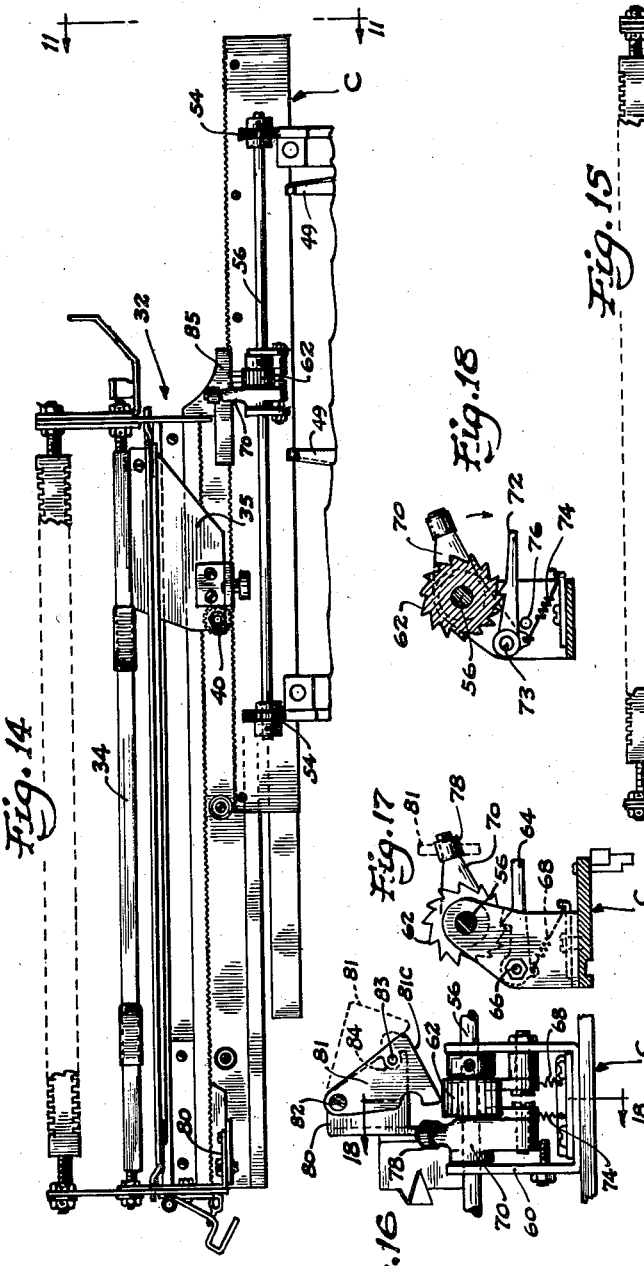
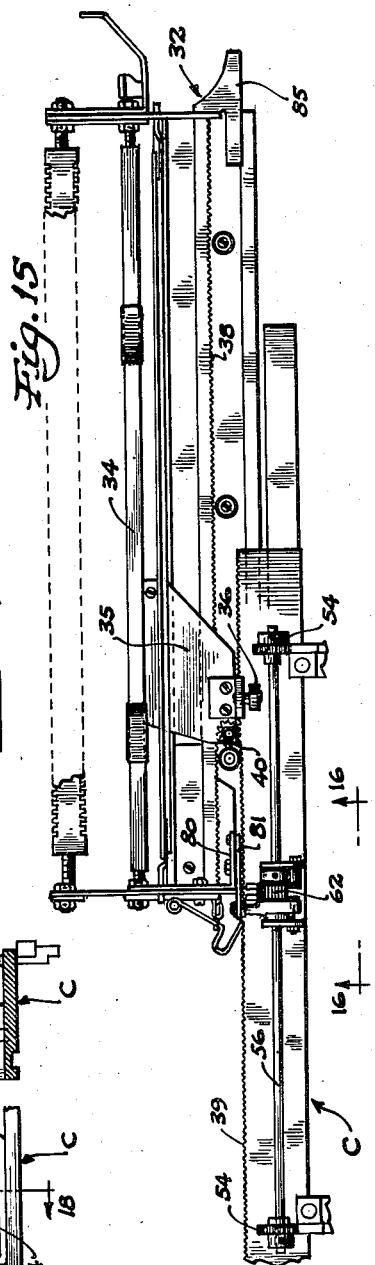
Inventor
John H. Gruver
By Wallace and Cannon
Attorneys Aug. 5, 1952 J. H. GRUVER 2,605,878
EMBOSSING MACHINE
Filed Sept. 13, 1949 8 Sheets-Sheet 8
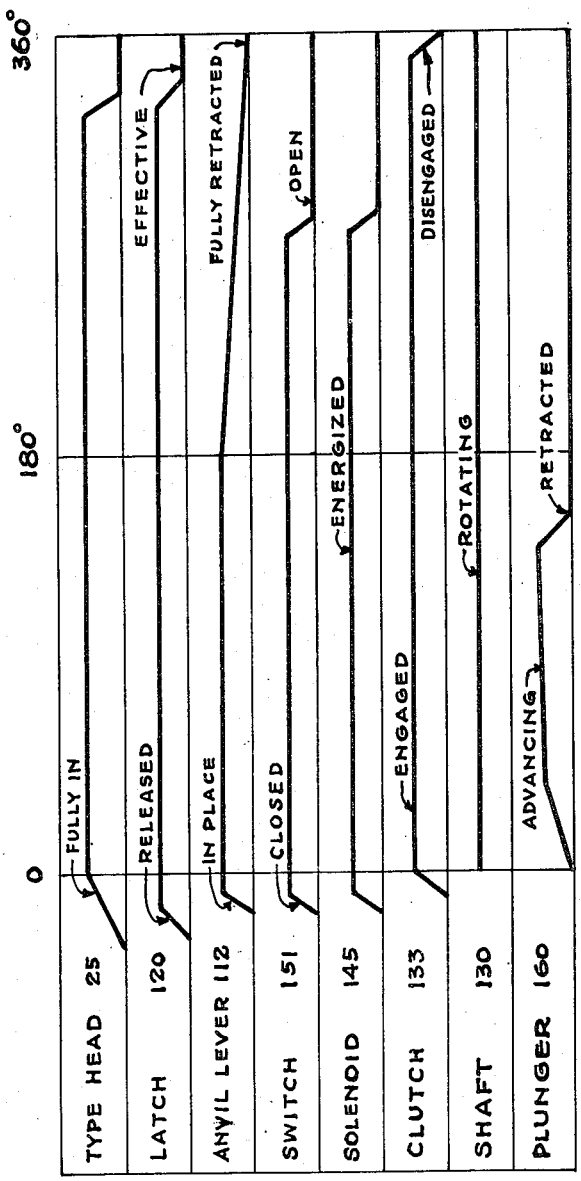
Inventor
John H. Gruver
By Wallace and Cannon
Attorneys Patented Aug. 5, 1952

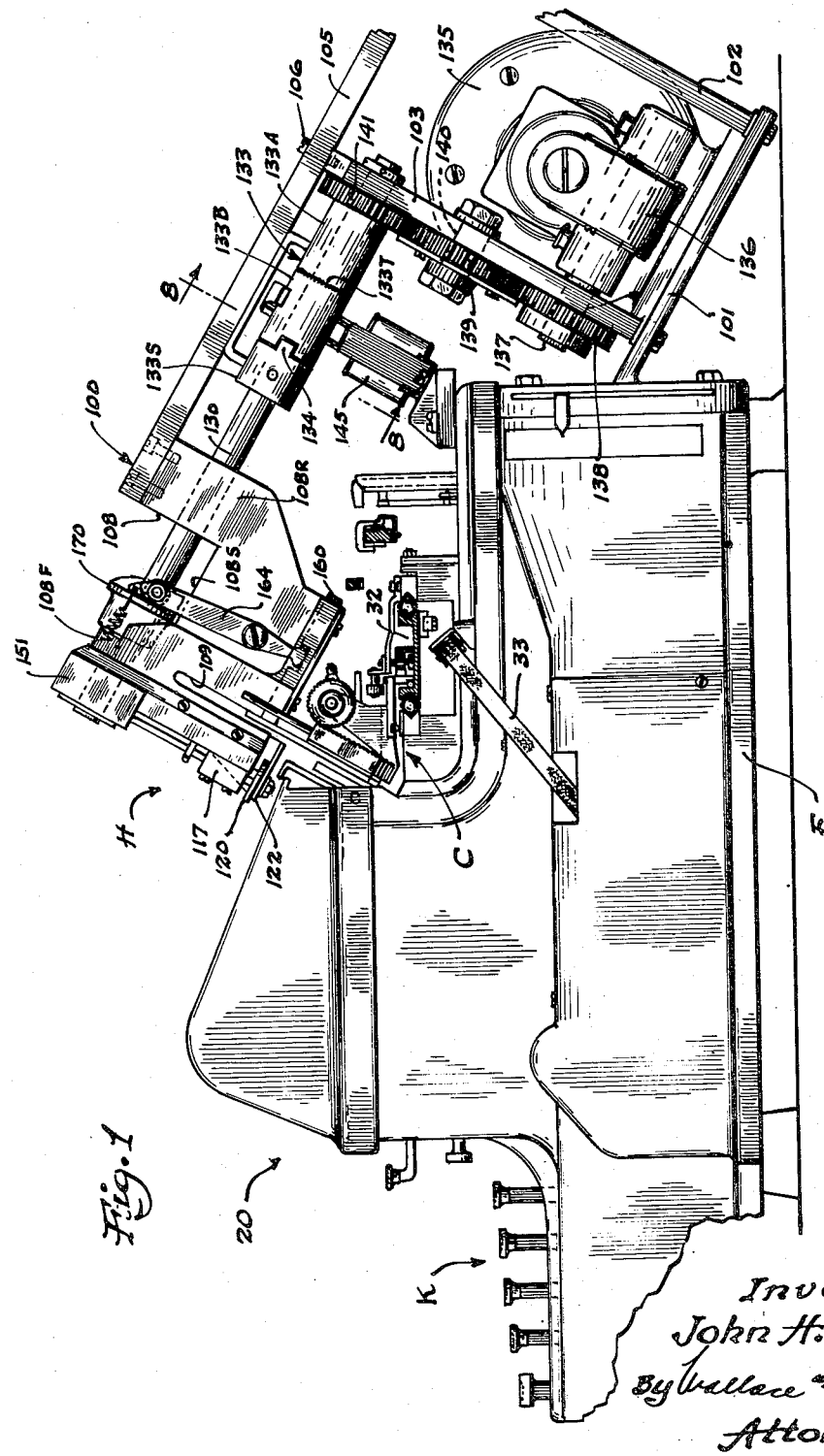

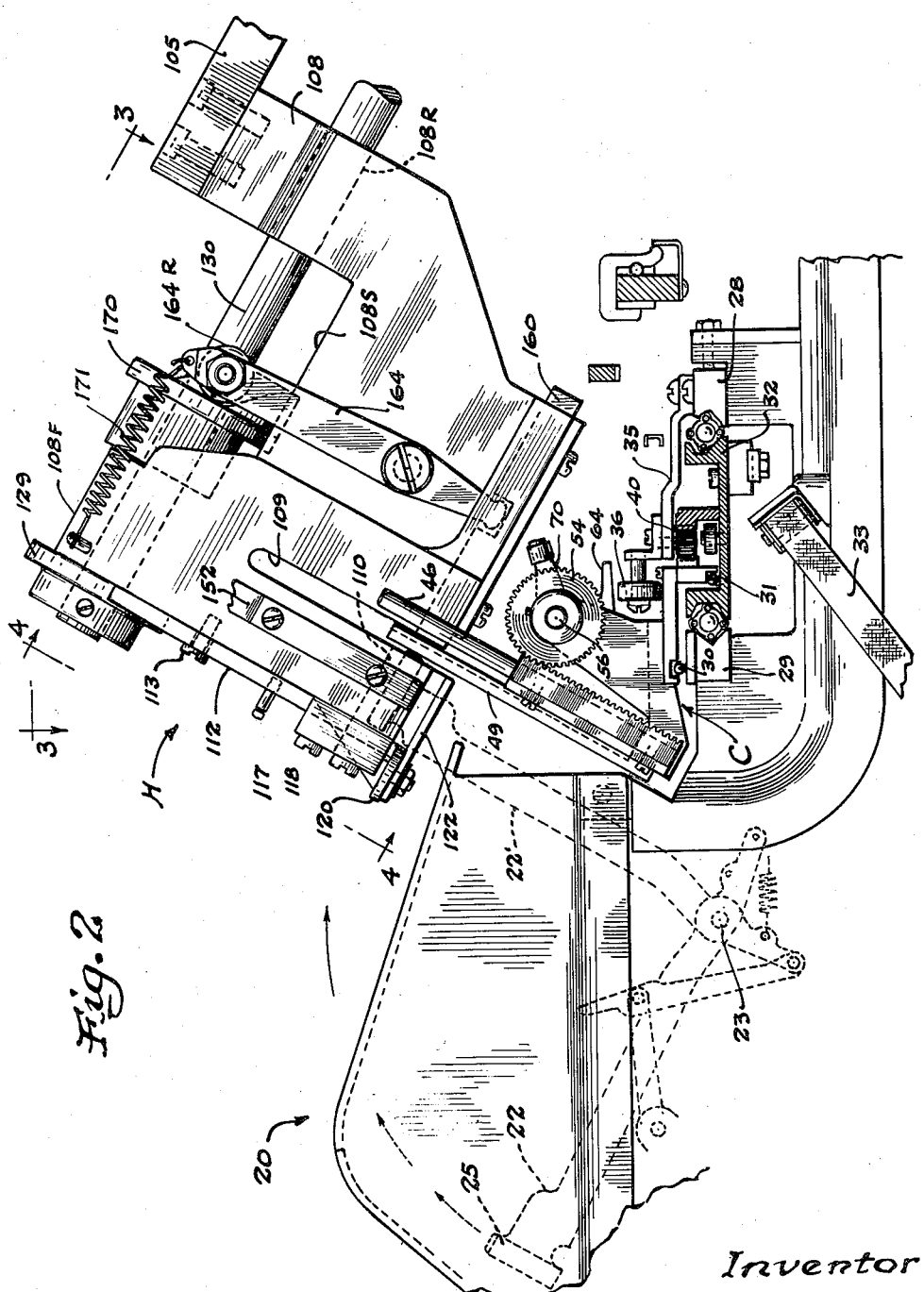

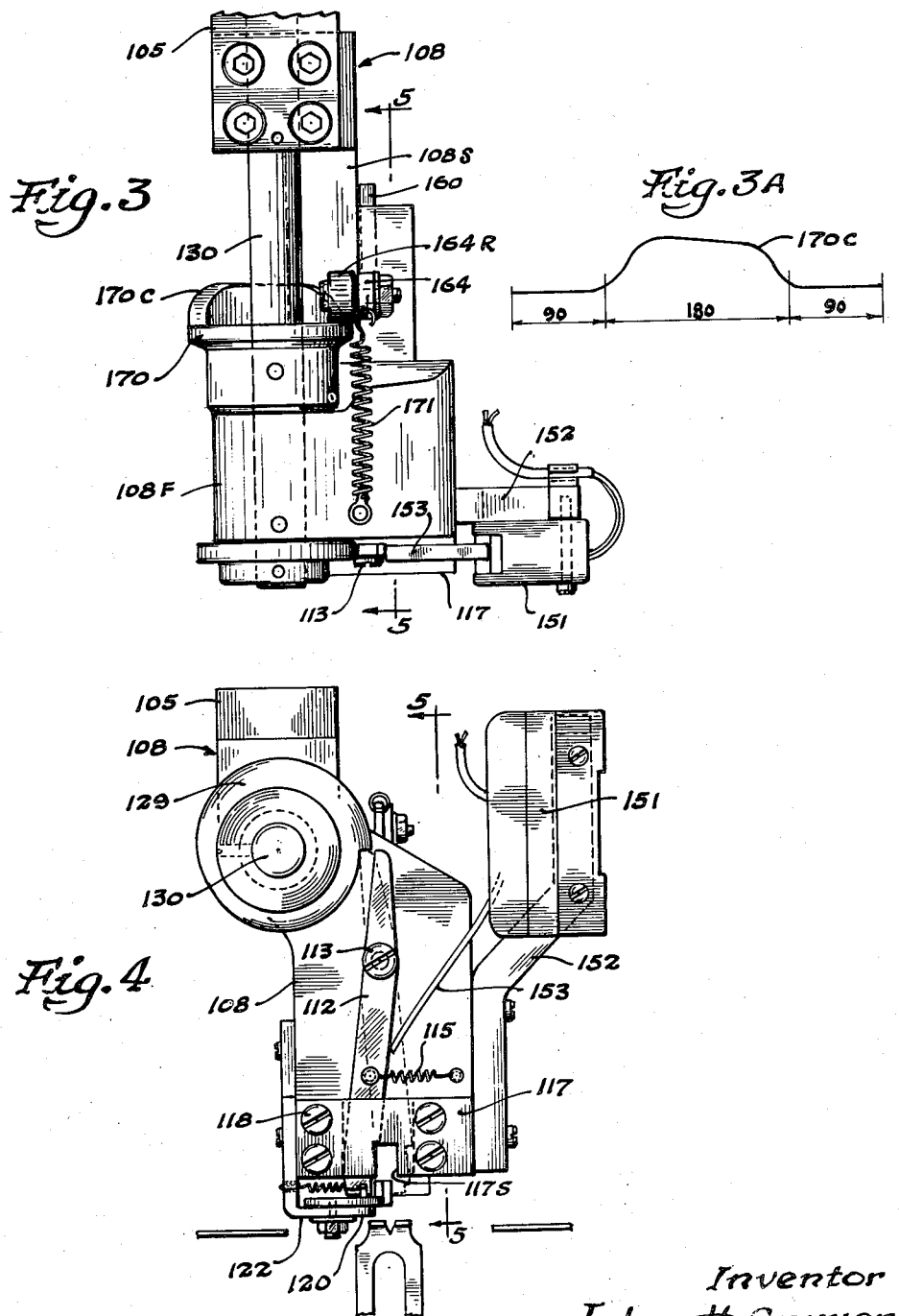

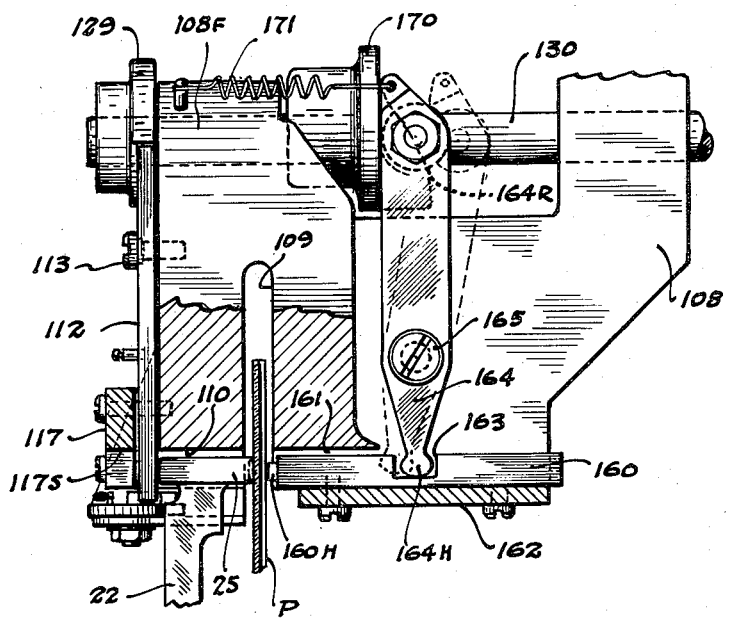
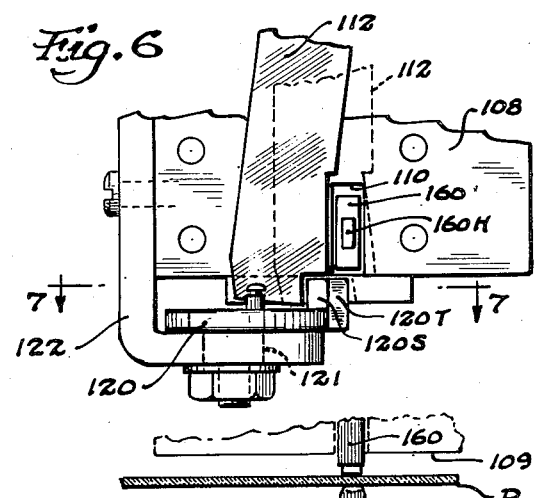
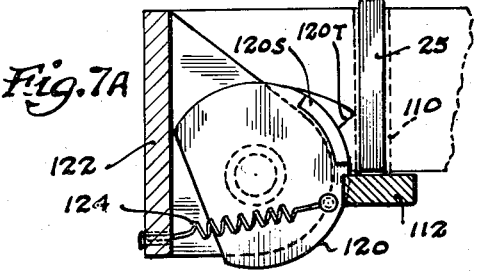
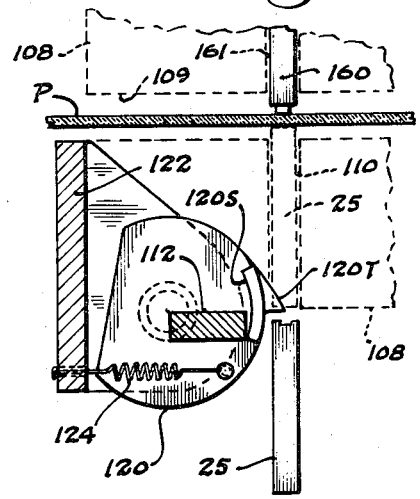

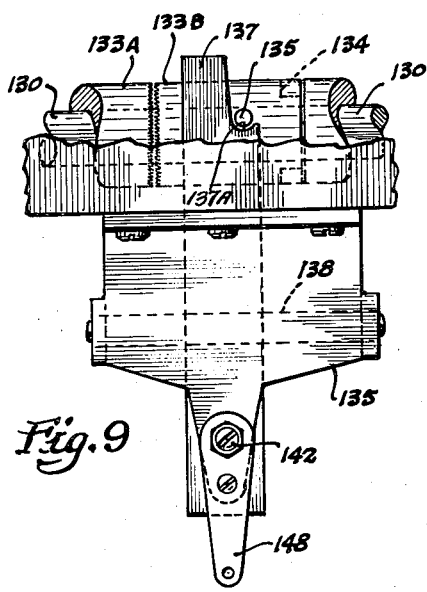
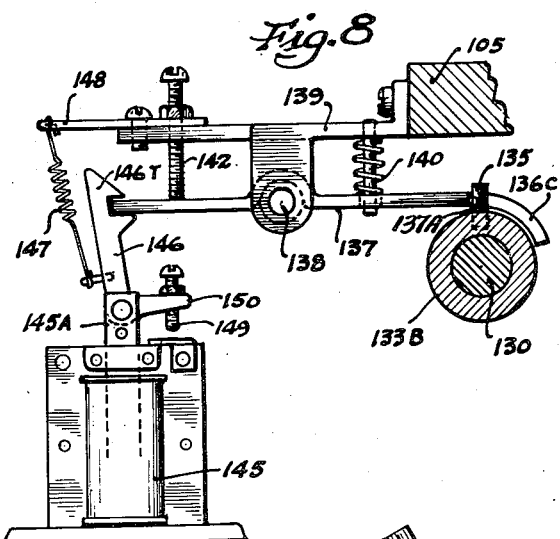
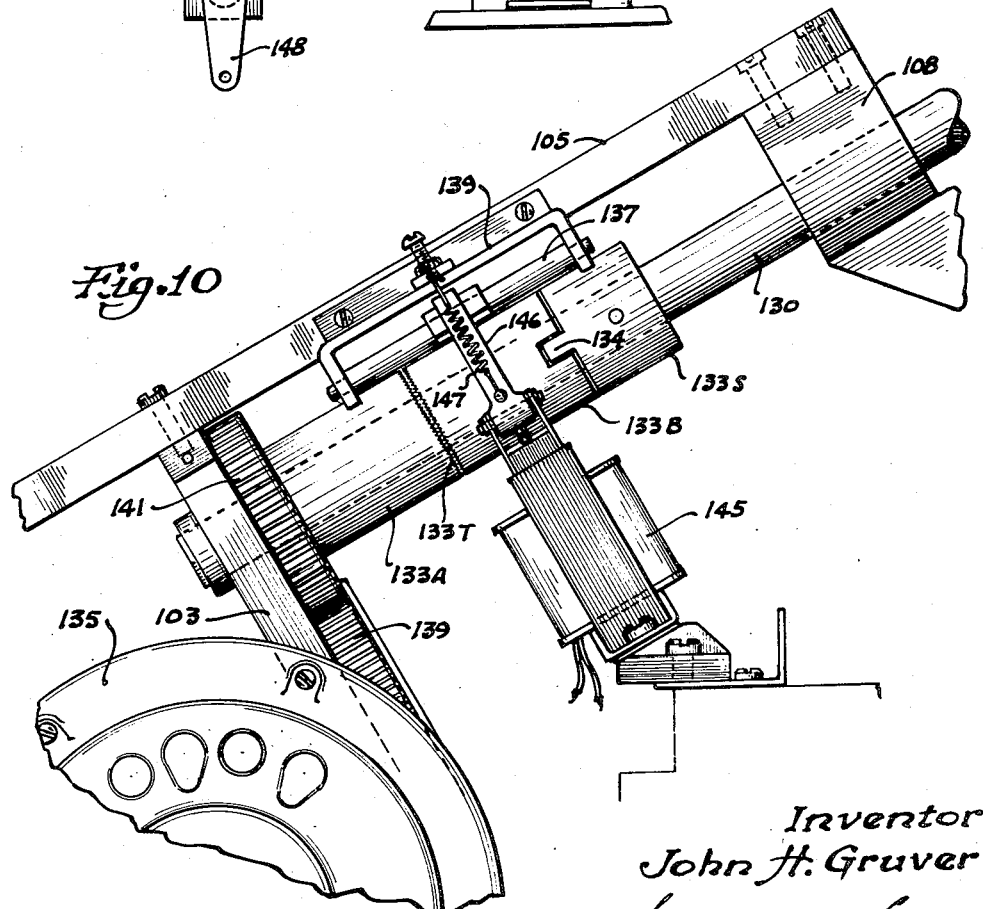

2,605,878

UNITED STATES PATENT OFFICE 2,605,878

EMBOSSING MACHINE

John H. Gruver, Cleveland Heights, Ohio, assignor to Addressograph-Multigraph Corporation, Wilmington, Del., a corporation of Delaware Application September 13, 1949, Serial No. 115,395

12 Claims. (Cl. 197—6)

This invention relates to the production of printing plates and particularly to production of embossed printing characters on printing plates made of a moldable plastic material.

Printing plates that are used in charge plate installations in department stores and the like are in most instances made as embossed metallic plates, and the same is true in respect to printing plates that are customarily used in printing machines of the kind wherein embossed printing plates are passed one by one through the machine to a printing position, such, for example, as the printing machine shown in the Carl J. Hueber Patent No. 2,359,850, patented October 10, 1944. It has been proposed in the past to make such printing plates from a moldable plastic material such as a thermoplastic resin, but since these printing plates must be embossed individually and in establishments of relatively small size, the problem of producing satisfactorily embossed type characters on such plastic printing plates has prevented such plastic printing plates from gaining any degree of commercial acceptance. It is, therefore, an important object of the present invention to enable plastic printing plates to be readily and easily formed with the desired combinations of embossed printing characters thereon, and a related object is to enable this to be accomplished through the use of a mechanism that is relatively simple in character and which may be operated by anyone who is trained to operate an ordinary typewriter. Other and related objects are to enable the embossed characters to be formed relatively rapidly and to enable accuracy of form and relation in the embossed characters to be attained without the necessity of heating the plastic material or the forming elements.

Other and further objects of the present invention will be apparent from the following description and claims and are illustrated in the accompanying drawings, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a machine embodying the features of the invention and adapted for the production of embossed type characters on plastic printing plates;

Fig. 2 is an enlarged side elevational view of a portion of the mechanism shown in Fig. 1;

Fig. 3 is a plan view showing a portion of the mechanism of Fig. 2, the view being taken substantially along the line 3—3 of Fig. 2;

Fig. 3A is a schematic view illustrating a development of one of the operating cams illustrated in Fig. 3;

Fig. 4 is a fragmentary front elevational view taken substantially along the line 4—4 of Fig. 2;

Fig. 5 is a vertical sectional view taken substantially along the line 5—5 of Figs. 3 and 4;

Fig. 6 is a fragmentary view illustrating a portion of the structure shown in Fig. 4 at a larger scale;

Fig. 7 is a horizontal sectional view taken substantially along the line 7—7 of Fig. 6;

Fig. 7A is a view similar to Fig. 7 and illustrating the elements in a different relationship;

Fig. 8 is a sectional view taken substantially along the line 8—8 of Fig. 1;

Fig. 9 is a fragmentary plan view of the mechanism shown in Fig. 8;

Fig. 10 is a fragmentary side elevational view of the driving mechanism, this view being somewhat similar to Fig. 1 but being taken from the opposite side of the machine;

Fig. 11 is an end elevational view of the carriage and cross slide mechanism upon which the plastic printing plate is mounted, the view being taken from the line 11—11 of Figs. 12 and 14;

Fig. 12 is a fragmentary plan view of the mechanism shown in Fig. 11;

Fig. 13 is a front face view of the plate supporting cross slide and its mounting, the view being taken substantially along the line 13—13 of Fig. 11;

Figs. 13A and 13B are fragmentary perspective views illustrating the front and rear faces, respectively, of a plastic printing plate having type characters formed thereon;

Fig. 14 is a plan view illustrating the way in which the plate holding carriage and cross slide are driven from the usual carriage actuating mechanism of the machine;

Fig. 15 is a view similar to Fig. 14 with the carriage elements shifted to a different position;

Fig. 16 is an enlarged front elevational view of the line spacing mechanism illustrated in Figs. 14 and 15, the view being taken from the line 16—16 in Fig. 15;

Fig. 17 is a view taken from the right in Fig. 16;

Fig. 18 is a sectional view similar to Fig. 17 and taken along the line 18—18 of Fig. 16; and Fig. 19 is a timing chart.

For purposes of disclosure, the invention is herein illustrated as embodied in an embossing machine 20 that has been constructed through modifications of and additions to a typewriter of a well known commercial construction. The typewriter that has been employed in the production of the present embossing machine 20 is sold commercially under the trade-mark "Electromatic" and is manufactured and sold by International Business Machines Corporation of New York city. This typewriter as herein shown embodies a keyboard K located at the forward end of a main frame F, and under control of the individual keys of the keyboard K, any selected one of a plurality of type bars 22 may be actuated about a pivotal mounting 23 so as to move the type bar upwardly and rearwardly toward an effective position indicated at 22' in Fig. 2 of the drawings. In the typewriter that has been utilized in the production of the present machine, such movement of a type bar 22 is normally effective to bring a conventional type head (not shown) into cooperation with conventional ribbon mechanism and a paper supporting platen that is shiftably mounted on a transverse carriage mechanism of well known construction, a part of such carriage mechanism, the platen, and the ribbon mechanism having been removed in the present machine and having been replaced by other mechanism, as will hereinafter be described. The conventional type heads carried at the ends of the respective type bars 22 have in the present instance been replaced by special type heads 25 that are in the nature of embossing dies whereby embossed type characters 26, Figs. 13A and 13B, may be formed on the surface of a plastic printing plate P as will hereinafter be described. Such plastic plate may be made from a thermoplastic material such as cellulose acetate.

In attaining a shiftable mounting for the plastic printing plate P, a longitudinally shiftable carriage C is mounted in a position just above and near the forward edge of the mounting guide 29 that acts through ball bearing elements to support and guide the forward edge of the usual carriage of the typewriter from which the present machine is made. This carriage C is mounted and guided by means of ball bearing elements on a forward guide 30 that is disposed along the top of the usual guide 29, and an additional guide 31, afforded on the usual carriage 32 of the typewriter, acts through ball bearing elements to guide and support the rear edge of the carriage C, the carriage 32 having the usual spring biasing mechanism 33 and margin stop mechanism 34 associated therewith, as well as the usual escapement mechanism for governing the character spacing movements of the carriage under the spring biasing action of the spring mechanism 33. To hold the carriage C downwardly and in the desired relationship with respect to the guides 30 and 31, a stationary arm 35 is extended forwardly from the top of the stationary guide 28, as will be evident in Figs. 14 and 15 of the drawings, and this stationary member carries a roller 36 that rides on the top surface of the carriage C, as best shown in Fig. 2 of the drawings.

The present machine is adapted for producing embossed type characters 26 in a reversed relationship so that the character spacing movements of the carriage C must be opposite to the movements of the usual typewriter carriage, and this is attained by affording a reversing driving connection between the usual carriage 32 and the carriage C. Thus, as will be evident in Figs. 2, 14 and 15, the usual carriage 32 has a forwardly facing rack 38 mounted thereon, while the carriage C has a rearwardly facing rack 39 formed thereon, and between these two racks a pinion 40 is mounted and suspended on a stationary axis from the bracket 35, so as to mesh with the two racks 38 and 39. Through this arrangement, the character spacing movements of the carriage 32 in a left-hand direction are operable to impart corresponding character spacing movements to the carriage C in a right-hand direction.

The carriage C has a cross slide 45 mounted thereon as best shown in Figs. 11, 12 and 13, and such cross slide is arranged to be supported upon a pair of upwardly and rearwardly extending guide rods 46. In attaining this mounting of the cross slide 45, it should be observed that the cross slide 45 is in the form of a horizontal bar having guide blocks 47 at opposite ends, these guide blocks having longitudinal bores formed therethrough so that these guide blocks may slide along the guide rods 46. The horizontal bar of the cross slide 45 is arranged to provide a pair of upwardly and rearwardly extending supporting members 49 that have channels 49C formed in their adjacent edges, and a printing plate P may be mounted in the cross slide 45 by sliding the same downwardly into the slots 49C until the lower edge of the printing plate engages stops 49S at the bottoms of the grooves 49C. The printing plate P that is thus mounted in the supporting members 49 may be moved longitudinally through character spacing movements, and by shifting movements of the cross slide 45 along the guides 46, the printing plate may be line spaced. Thus, as will be evident in Figs. 11 to 13, the cross slide 45 is urged in a downward direction by a spring 50 that acts between a stationary anchoring pin and one of the guide blocks 47, and the line spacing movements in an upward direction are imparted to the cross slide 45 against the downward or return action of the spring 50. In attaining such line spacing control of the cross slide 45, each of the guide blocks 47 has a rack 52 fixed thereon, and these racks are respectively engaged by pinions 54 that are fixed on opposite ends of a line spacing shaft 56. The line spacing shaft 56 is mounted at its adjacent ends in upstanding supporting brackets 58 that are mounted on the carriage C, and adjacent to the central portion of the line spacing shaft 56, means are afforded to impart line spacing movements to the shaft 56 or to release such shaft so that the cross slide 45 may be returned to its lower or initial position.

Such means are afforded on the shaft 56 between the upwardly extending arms of a supporting bracket 60 that is mounted on the carriage C so as to afford additional support for the shaft 56. Substantially midway between the arms of the bracket 60, a ratchet wheel 62 is fixed on the shaft 56, and on the inner surface of the right-hand arm of the bracket 60, a retaining pawl 64 is pivoted on a pivot stud 66, as will be evident in Figs. 16 to 18. A spring 68 acts on a downwardly extending portion of the retaining pawl 64 so as to normally maintain this pawl in such a relation to the ratchet wheel 62 as to hold the cross slide 45 against downward or return movement. On the left-hand side of the ratchet wheel 62, as viewed in Fig. 16 of the drawings, a rocker 70 is pivotally supported on the shaft 56, and this rocker has a pawl 72 pivoted thereon at 73 adjacent to the forward end of the rocker 70. A spring 74 acts on the pawl 72 so as to urge the same into effective relationship in respect to the ratchet wheel 62, and when it is desired to impart a line spacing movement to the cross slide 45, the rocker 70 is rocked in a clockwise direction, Fig. 18. It will be noted that the spring 74 acts in a forward and downward direction, as shown in Fig. 18; so that the rocker 70 normally comes to rest with a portion thereof in engagement with a stop pin 76, and the line spacing movements are attained by controlled rocking of the rocker 70 from this normal position. In attaining such rocking movements, the rear end of the rocker is provided with a roller 78 which may cooperate with cam mechanism at certain points in the cycle of movement of the carriage C to attain the desired shifting movement of the rocker 70.

Under the present invention, the carriage 32 is arranged to cooperate in attaining such actuation of the rocker 70, and for this purpose a bracket 80 is mounted near the left-hand end of the carriage 32, as shown in Figs. 14, 15 and 16, and a swinging cam member 81 is pivoted thereon at 82. This cam member 81 has a stop pin 83 thereon which is arranged to strike a stop shoulder 84 formed on the bracket 80 to limit clockwise movement of the swinging cam member 81. This cam member has a lower cam surface 81C that in the normal position of the cam member 81 is located in the path of the roller 78. Hence, when the carriages C and 32 are returned from positions such as the position shown in Fig. 14, to their initial positions shown in Fig. 15 of the drawings, the cam surface 81C and the roller 78 are engaged, and the rocker 70 is rocked through a line spacing movement. In such movement the roller 78 moves to the left beyond the cam member 81, it being noted, of course, that the cam member 81 is at the same time moving to the right with the carriage 32 upon which it is mounted. Thus, at the end of the return movement, and after the line spacing operation has taken place, the roller 78 is disposed in the relationship shown in Figs. 15 and 16 of the drawings. In the subsequent character spacing movements of the carriage C to the right, the roller 78 strikes a substantially vertical edge of the cam member 81, and the cam member is pivoted to the dotted line position shown in Fig. 16 so that the roller 78 returns beneath the cam member 81 without actuation of the roller 78. The cam member then returns by gravity to its effective position of Fig. 16.

When the cross slide 45 is to be released for downward or return movement under the influence of its return spring 50, both of the pawls 64 and 72 are released, and this is accomplished by moving the carriages C and 32 to the ends of their strokes in a character spacing direction or, in other words, to the positions shown in Fig. 14 of the drawings. When this is done, the rear or tail end portions of the pawls 64 and 72 ride into position beneath a release cam 85 that is fixed on the left-hand end portion of the carriage 32, as will be evident in Figs. 11, 14 and 15 of the drawings. In such release movement, the cross slide 45 moves downwardly into a position beyond what is to constitute the first line spacing position, and then, when the carriage C is returned to its initial position, a line spacing operation takes place as above described so as to move the printing plate P into what may be termed its first line spacing position so that the first line of embossed characters 26 may be formed thereon, as will now be described.

Under and in accordance with the present invention, the embossing operation is performed in such a way that it is not necessary to heat the plate P or any of the character forming elements, and in accomplishing this result, means are afforded for latching each type head 25 in position opposite the forward face of the printing plate P and for thereafter forcing the plate P into forming cooperation with the type head 25, after which the type head is released so that it may return to its normal position and cause character spacing movement of the carriage C through operation of the usual character spacing mechanism of the typewriter from which the present machine is constructed.

In accomplishing this character forming operation upon the printing plate P, an operating unit 100 is mounted on the rear portion of the frame F of the machine so as to support driving and control elements and to also support an operating head structure H in position at the point where the type heads 25 are engaged with the printing plate P. Thus, as shown in Fig. 1 of the drawings, a downwardly and rearwardly extended mounting plate 101 is secured to the rear portion of the frame F, and from this plate 101, a pair of spaced frame plates 102 and 103 extend upwardly and rearwardly. At the upper edges of the frame plates 102 and 103, an upwardly and forwardly extending frame plate 105 is secured by means such as attaching screws 106. The plate 105 extends for a considerable distance forwardly of the plate 103, and at its forward end the plate 105 has a relatively heavy mounting and bearing bracket 108 secured thereto. The bracket 108 extends downwardly and then forwardly and has an upwardly and rearwardly extending slot 109 formed therein so as to afford a relatively deep throat through which the printing plate P and the supporting members 49 may pass in any line spacing position of the cross slide 45. In the portion of the bracket 108 that is disposed forwardly of the throat 109, a slot 110 is formed into which a type head 25 may move into engagement with a plate P that is located in the throat 109. In accordance with the present invention, means are afforded on the mounting bracket 108 for latching the type head in position in engagement with the plate P, and such means serve as a back-up member for holding the type head 25 in position while substantial character forming forces are applied to the rear surface of the plate P.

Thus, in the present instance, a relatively heavy anvil lever 112 is pivoted on the forward face of the bracket 108 by means of a pivot 113, and the anvil lever 112 is disposed in a generally vertical position and may be moved from a retracted position shown in Fig. 4 of the drawings to an effective position shown in dotted outline in Fig. 6 of the drawings, and in which the anvil lever 112 is disposed forwardly of the type head 25 that is disposed in the slot 110. The anvil lever 112 is urged in a counter-clockwise direction, Fig. 4, by a spring 115 so as to normally tend to move into its effective position, but latch means are afforded in association with the anvil lever 112 for normally retaining the anvil lever in its retracted or ineffective position of Fig. 4, so that a type head 25 may move into position within the slot 110. It will be noted in Figs. 4 and 5 that the lower end portion of the anvil lever 112 has a guide and back-up bar 117 extended along the forward face of the lever 112, this bar 117 being secured in place on the bracket 108 by screws 118. The lower edge of the bar 117 is upwardly slotted as at 117S to afford what is in effect a continuation of the slot 110 which permits movement of the type heads 25 into effective position.

The latch means that are effective to hold the lever 112 in its retracted position are, in the present instance, in the form of a modified disk 120 that is mounted on a vertical pivot 121 on the upper surface of the horizontal arm of a bracket 122 that is disposed beneath the lower edge of the bracket 108, and just below the lower end of the anvil lever 112. This disk 120 is urged in a clockwise direction, Fig. 7A, by a spring 124, and when the anvil lever 112 is in its ineffective position, this clockwise movement of the disk 120 will serve to move an upstanding segment 120S on the disk 120 into position to the right of the lower end portion of the lever 112, as shown in Fig. 6 of the drawings. The disk 120 also has a tooth 120T which, in such an instance, will be located in the path of any type head 25 that is moved toward effective position within the slot 110. Hence, such a type head will be effective to shift the latch disk 120 from its effective position of Fig. 7 to its ineffective position of Fig. 7A, thus to release the anvil lever 112 for movement to its effective position of Fig. 7A. When this occurs, the latch disk 120 will be held against return movement by engagement of the side of the head 25 with the end edge of the tooth 120T, but upon return of the anvil lever 112, as will hereinafter be described, to its ineffective position of Figs. 4 and 6, and upon the resultant return movement of the type head 25, the latch disk 120 will, of course, return to its effective position and will hold the anvil lever in such ineffective position.

The anvil lever 112 remains, of course, in its effective position during the performance of the character forming operation, and at the end of this character forming operation is moved to its ineffective position at the time indicated in Fig. 19 by a control cam 129 that is fixed on the forward end of a main operating shaft 130. This main operating shaft is disposed below and parallel to the plate 105, as will be evident in Fig. 1 of the drawings, and this shaft is journaled in the plate 103 and at spaced points in bearing portions 108R and 108F, there being a recessed portion 108S between these two bearing portions so as to expose the intermediate portion of the shaft 130 for purposes that will appear hereinafter.

The shaft 130 is normally stationary, and when a type head 25 is moved into position in the slot 110, the release of the anvil lever 112 and its movement into its effective position serve, as will hereinafter be explained, to cause engagement of a one-revolution clutch 133 whereby the shaft 130 is driven through a single revolution. Driving power is afforded by a motor 135 that is mounted on the plate 101, as shown in Fig. 1 of the drawings, and this motor is connected through a reduction gearing 136 to an actuating shaft 137 that extends forwardly through the lower portion of the frame plate 103. A gear 138 is fixed on the shaft 137 and meshes with an idler gear 139 that is mounted on a stud 140 on the forward face of the plate 103, the gear 139 being meshed with a gear 141 that is loosely mounted on the shaft 130 just forwardly of the frame plate 103. The motor 135 is constantly driven during use of the machine so that gear 141 is similarly driven, and a driving clutch sleeve or member 133A is disposed about the shaft 130 just forwardly of the gear 141 to which such driving clutch member is fixed. The driving clutch member 133A is arranged for cooperation with a driven clutch member 133B which surrounds the shaft 130 just forwardly of the sleeve 133A, and the sleeves 133A and 133B have clutch teeth 133T on their adjacent ends which may be engaged by longitudinal shifting movement of the driven clutch member 133B along the shaft 130. The clutch 133 is of the general character disclosed in the patent to Walter T. Gollwitzer, No. 2,265,133, patented December 9, 1941, and as described in detail in such patent, the driven clutch member 133B is operatively connected to the shaft 130 through a connecting sleeve 133S that is pinned to the shaft 130, as shown in Fig. 1. The sleeve 133S has a tooth 134 thereon that projects axially into a complemental groove or notch in the adjacent end of the sleeve 133B, and as described in the aforesaid Gollwitzer patent, spring means acting in an axial direction between the sleeves 133B and 133S are effective to urge the sleeve 133B toward its engaged relationship with respect to the driving clutch member 133A. The driven clutch sleeve 133B has a radially projecting pin 135 thereon, as will be evident in Figs. 8 and 9, and in the rotation of the driven clutch member 133B, this pin 135 is arranged to move into engagement with a cam surface 136C that is formed on the end portion of a stop lever 137. As the pin 135 moves along the surface 136C in a counter-clockwise direction, as viewed in Fig. 8, the camming action on the pin 135 serves to disengage the driven clutch sleeve 133B, and when this disengagement has been completed and the pin 135 has moved into the home position shown in Figs. 8 and 9, the pin strikes an abutment shoulder 137A so that the driven member comes to rest at a predetermined angular position.

The stop lever 137 is pivoted at 138 on a bracket 139 that is mounted on the side of the plate 105, as shown in Figs. 8 and 9, and a spring 140 acts on the lever 137 to urge the same toward the effective position shown in Fig. 8 wherein the rounded right-hand end of the lever is disposed relatively close to the surface of the sleeve 133B, this position being determined by an adjustable stop screw 142 that is mounted in the bracket 139 as shown in Figs. 8 and 9. When the clutch 133 is to be engaged, the stop lever 137 is rocked in a counter-clockwise direction, Fig. 8, by means including a solenoid 145. This solenoid has its armature 145A disposed substantially beneath the rear or left-hand end of the stop lever 137, as viewed in Fig. 8, and an actuating pawl 146 is pivoted on the upper end of the armature 145 and has a tooth 146T at its upper end that may be disposed over the upper end edge of the stop lever 137. The pawl 146 is urged to such position by a spring 147 that is connected between the pawl 146 and an anchoring arm 148 that is mounted on the bracket 139. When the solenoid 145 is energized, the pawl 146 is moved downwardly so as to rock the stop lever 137 in a counter-clockwise direction to a released position so that the clutch 133 may engage, and after release of the pin 135, a screw 149 mounted on an arm 150 of the pawl 146 engages a stationary part of the solenoid 145 so that continued downward movement of the armature 145A causes the pawl 146 to be released from the stop lever 137, thereby allowing the stop lever 137 to return to its effective position in ample time to cause disengagement of the clutch 133. Upon deenergization of the solenoid 145, a cam surface on the upper end surface of the pawl 146 permits the pawl to move upwardly and into proper alignment with the end of the stop lever 137 so that the pawl 146 again resumes this connected relationship in respect to the stop lever 137.

The solenoid 145 is energized as hereinabove pointed out whenever the anvil lever 112 is in its effective position, and this is accomplished by an energizing circuit that includes a switch 151 that is mounted on a bracket 152 on the left-hand side of the forward portion of the bracket 108. This switch has a resilient operating arm 153 associated therewith and extended downwardly and to the left in Fig. 4 of the drawings so as to be engaged by the anvil lever 112 as this anvil lever moves toward its effective position. Hence, the switch 151 is closed and the solenoid 145 is energized at about the time when the anvil lever 112 reaches its effective position. This, of course, causes engagement of the one-revolution clutch 133 so that rotation of the shaft 130 is initiated.

Such rotation of the shaft 130 is effective to cause the plate P to be forced into character-forming cooperation with the type head 25 that is at this time held in position forwardly of such printing plate P. For this purpose, the bracket 108 has a plunger 160 mounted in a guideway along the lower portion of the bracket and in alignment with the position that is to be occupied by a type head 25 in the slot 110. Thus, the guideway is afforded in part by a slot 161 formed in alignment with the slot 110 and rearwardly of the throat 109, and a supporting plate 162 forms an additional portion of such guideway. Rearwardly of the slot 161, the upper face of the plunger 160 is exposed and a transverse slot 163 is formed therein. An operating lever 164 is pivoted at 165 on the side of the track 108 and just above the plunger 160, and a rounded head 164H on the lower end of the lever 164 is disposed within the slot 163 so that by rocking movement of the lever 164 the plunger 160 may be reciprocated through the desired forming strokes. In this connection it is to be noted that the plunger 160 has a reduced forming head 160H that is of rectangular cross section and which is forced into the rear face of the plate P to form a recess 160P, as shown in Figs. 13A and 13B. In such movements, the material of the printing plate P that is aligned with the head 160H is forced in a forward direction and into the die cavity in the type head 25 that is located in the slot 110, and this serves to form the desired embossed character on the printing plate P.

The operating lever 164 extends upwardly, as will be evident in Figs. 3 and 5, and has a roller 164R fixed thereon so that such roller may engage the cam surface 170C of a face cam 170 that is illustrated in Figs. 3, 3A and 5 of the drawings. The cam 170 is fixed on the shaft 130 in the recess or space 108S. The developed surface 170C is illustrated in Fig. 3A of the drawings, and its effectiveness on the lever 164 will be apparent from the timing chart illustration included in Fig. 19 with respect to the plunger 160. A spring 171 acts between the upper end of the lever 164 and the bracket portion 108F so that the cam 170 is effective to govern and control the movements of the forming plunger 160. As will be evident in Fig. 19 of the drawings, the plunger 160 advances fairly rapidly until it is in firm contact with the rear face of the plastic printing plate P, and thereafter during the actual character forming operation the advancing movement is relatively slow so that the forming operation is in effect performed by what might be termed a squeezing action in which the material of the plate P is squeezed between the head 160H and the die cavity of the type head 25. When the forming operation has been completed, the retracting movement of the plunger 160 takes place quite rapidly, as will be evident in Fig. 19 of the drawings, and the character forming operation is completed within the first 180° of movement of the shaft 130.

After the forming movements of the plunger 160 have thus been completed, the cam 129 becomes effective upon the anvil lever 112 so as to start movement of this lever toward its ineffective position, and when this movement has progressed to about a mid-position, the corresponding movement of the switch operating lever 153 causes the switch 151 to be opened, thereby deenergizing the solenoid 145 and allowing the pawl 146 to return to its upper position wherein it is conditioned for the next machine cycle. When the anvil lever has substantially reached its most left-hand or ineffective position, the lever becomes disengaged from the rear surface of the type head 25, and thus the type head 25 may move forwardly through its return movement, and this, of course, is effective in the usual way to produce character spacing movement of the carriage 32 and hence of the carriage C. When the anvil lever 112 is thus moved to its ineffective position, the latch 120 returns to its effective position so as to hold the anvil lever 112 in its ineffective position after the cam lobe of the cam 129 has moved out of alignment with the upper end of the anvil lever 112. The machine is thus conditioned for the next cycle of machine operation.

From the foregoing description it will be evident that the present invention enables embossing of plastic printing plates to be accomplished readily and easily and in such a manner that the work may be done by any person who has been trained to operate a typewriter. Moreover, the present invention enables such embossing operations to be accurately controlled and to be performed without heating of the printing plates or the forming elements.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims:

I claim:

1. In an embossing machine for forming embossed type characters one by one on a plastic printing plate, a plurality of type heads having die cavities formed therein defining the respective type characters that are to be formed, a plurality of supporting arms on corresponding ends of which the respective type heads are fixed, means supporting said arms for individual movement from retracted positions wherein the type heads are supported side by side in a row to operated positions wherein the type head of an arm in its operated position is disposed in a working position that is the same for each type head, means including carriage and cross slide means for supporting and variantly positioning a plastic printing plate opposite said working position for cooperation with the die cavity of a type head in such working position, an anvil movable into position to hold such a type head in said working position, a pressure applying ram for forcing such a printing plate into forming cooperation with a type head in said working position, and means operable in timed relation to said ram to release said anvil.

2. In an embossing machine for forming embossed type characters one by one on a plastic printing plate, a plurality of type heads having die cavities formed therein defining the respective type characters that are to be formed, a plurality of supporting arms on corresponding ends of which the respective type heads are fixed, means supporting said arms for individual movement from retracted positions wherein the type heads are supported side by side in a row to operated positions wherein the type head of an arm in its operated position is disposed in a working position that is the same for each type head, means including carriage and cross slide means for supporting and variantly positioning a plastic printing plate with one face disposed opposite said working position for cooperation with the die cavity of a type head in such working position, an anvil movable into position to hold such a type head in said working position, a pressure applying ram mounted for movement toward and away from the opposite face of such a plate and in alignment with said working position, and a projecting punch element on said ram for forcing a limited area of such a plate into forming cooperation with the die cavity of a type head disposed in said working position.

3. In an embossing machine for forming embossed type characters one by one on a plastic printing plate, a plurality of type heads having die cavities formed therein defining the respective type characters that are to be formed, a plurality of supporting arms on corresponding ends of which the respective type heads are fixed, means supporting said arms for individual movement from retracted positions wherein the type heads are supported side by side in a row to operated positions wherein the type head of an arm in its operated position is disposed in a working position that is the same for each type head, means including carriage and cross slide means for supporting and variantly positioning a plastic printing plate opposite said working position for cooperation with the die cavity of a type head in such working position, an anvil movable from a retracted position to an effective position wherein it is effective to hold such a type head in said working position, means urging said anvil to said effective position, a latch member normally operable to hold said anvil in said retracted position, means operable by a type head as it moves into said working position to release said latch member and cause movement of said anvil into said effective position, a pressure applying ram for forcing such a printing plate into forming cooperation with a type head in said working position, and means including a pair of cams operable to actuate said ram and to thereafter shift said anvil to said retracted position.

4. In an embossing machine for forming embossed type characters one by one on a plastic printing plate, a plurality of type heads having die cavities formed therein defining the respective type characters that are to be formed, a plurality of supporting arms on corresponding ends of which the respective type heads are fixed, means supporting said arms for individual movement from retracted positions wherein the type heads are supported side by side in a row to operated positions wherein the type head of an arm in its operated position is disposed in a working position that is the same for each type head, means including carriage and cross slide means for supporting and variantly positioning a plastic printing plate opposite said working position for cooperation with the die cavity of a type head in such working position, an anvil movable from a retracted position to an effective position wherein it is effective to hold such a type head in said working position, means urging said anvil to said effective position, a latch member normally operable to hold said anvil in said retracted position, means operable by a type head as it moves into said working position to release said latch member and cause movement of said anvil into said effective position, a pressure applying ram for forcing such a printing plate into forming cooperation with a type head in said working position, an operating shaft having a pair of cams thereon operable in a single revolution of the shaft to actuate said ram and to thereafter shift said anvil to said retracted position, means including a one-revolution clutch for driving said shaft, a solenoid for initiating a cycle of operation of said clutch, and an energizing circuit for said solenoid including a control switch adapted to be closed by said anvil when said anvil is in said effective position.

5. In an embossing machine for forming embossed type characters one by one on a plastic printing plate, a plurality of type heads having die cavities formed therein defining the respective type characters that are to be formed, means supporting said type heads for individual movement from retracted positions to a working position that is the same for each type head, means including carriage and cross slide means for supporting and variantly positioning a plastic printing plate opposite said working position for cooperation with the die cavity of a type head in such working position, an anvil movable from a retracted position to an effective position wherein it is effective to hold such a type head in said working position, means urging said anvil to said effective position, a latch member normally operable to hold said anvil in said retracted position, means operable by a type head as it moves into said working position to release said latch member and cause movement of said anvil into said effective position, a pressure applying ram for forcing such a printing plate into forming cooperation with a type head in said working position, and means including a pair of cams operable to actuate said ram and to thereafter shift said anvil to said retracted position.

6. In an embossing machine for forming embossed type characters one by one on a plastic printing plate, a plurality of type heads having die cavities formed therein defining the respective type characters that are to be formed, means supporting said type heads for individual movement from retracted positions to a working position that is the same for each type head, means including carriage and cross slide means for supporting and variantly positioning a plastic printing plate opposite said working position for cooperation with the die cavity of a type head in such working position, an anvil movable from a retracted position to an effective position wherein it is effective to hold such a type head in said working position, means urging said anvil to said effective position, a latch member normally operable to hold said anvil in said retracted position, means operable by a type head as it moves into said working position to release said latch member and cause movement of said anvil into said effective position, a pressure applying ram for forcing such a printing plate into forming cooperation with a type head in said working position, an operating shaft having a pair of cams thereon operable in a single revolution of the shaft to actuate said ram and to thereafter shift said anvil to said retracted position, means including a one-revolution clutch for driving said shaft, a solenoid for initiating a cycle of operation of said clutch, and an energizing circuit for said solenoid including a control switch adapted to be closed by said anvil when said anvil is in said effective position.

7. In an embossing machine for forming embossed type characters one by one on a plastic printing plate, a plurality of type heads having die cavities formed therein defining the respective type characters that are to be formed, a plurality of supporting arms on corresponding ends of which the respective type heads are fixed, means supporting said arms for individual movement from retracted positions wherein the type heads are supported side by side in a row to operated positions wherein the type head of an arm in its operated position is disposed in a working position that is the same for each type head, means including carriage and cross slide means for supporting and variantly positioning a plastic printing plate opposite said working position for cooperation with the die cavity of a type head in such working position, an anvil movable from a retracted position to an effective position wherein it is effective to hold such a type head in said working position, means urging said anvil to said effective position, a latch member normally operable to hold said anvil in said retracted position, means operable by a type head as it moves into said working position to release said latch member and cause movement of said anvil into said effective position, a pressure applying ram for forcing such a printing plate into forming cooperation with a type head in said working position, and means including a first cam operable to actuate said ram and a second cam operable to thereafter shift said anvil to said retracted position, said first cam being operable to rapidly advance said ram into initial contact with such a plate and to thereafter advance the ram at a slow rate to apply a gradual squeezing force to the material of the plate until the character formation is completed.

8. In a machine for forming embossed type characters on plastic plates and the like, a typewriter having a carriage shiftable through character spacing movements in one direction and having key controlled type arms movable selectively through operating strokes and having character spacing means for said carriage controlled by said type arms, character forming dies supported on said type arms for forming reverse-reading embossed type characters, a supplemental carriage mounted for movement parallel to said first-mentioned carriage, opposed racks supported on the respective carriages, a stationarily mounted rotative reversing pinion disposed between and meshed with said racks to impart character spacing movements to said supplemental carriage in the opposite direction and under control of said first-mentioned carriage, a cross slide mounted on said supplemental carriage and having means for supporting a plastic printing plate thereon for cooperation with said dies, line spacing means mounted on said supplemental carriage for imparting line spacing movements to said cross slide, means on said first mentioned carriage for operating said line spacing means, and means mounted on said supplemental carriage for imparting return movement to said cross slide.

9. In a machine for forming embossed type characters on plastic plates and the like, a typewriter having a carriage shiftable through character spacing movements in one direction and having key controlled type arms movable selectively through operating strokes and having character spacing means for said carriage controlled by said type arms, character forming dies supported on said type arms for forming reverse-reading embossed type characters, a supplemental carriage mounted for movement parallel to said first-mentioned carriage, opposed racks supported on the respective carriages, a stationarily mounted rotative reversing pinion disposed between and meshed with said racks to impart character spacing movements to said supplemental carriage in the opposite direction and under control of said first-mentioned carriage, a cross slide mounted on said supplemental carriage and having means for supporting a plastic printing plate thereon for cooperation with said dies, line spacing means mounted on said supplemental carriage for imparting line spacing movements to said cross slide, means on said first mentioned carriage at one end thereof for operating said line spacing means to impart line spacing movement to said cross slide, and means mounted on said supplemental carriage for imparting return movement to said cross slide.

10. In a machine for forming embossed type characters on plastic plates and the like, a typewriter having a carriage shiftable through character spacing movements in one direction and having key controlled type arms movable selectively through operating strokes and having character spacing means for said carriage controlled by said type arms, character forming dies supported on said type arms for forming reverse-reading embossed type characters, a supplemental carriage mounted for movement parallel to said first-mentioned carriage, motion transmitting means connecting the respective carriages to impart character spacing movements to said supplemental carriage in the opposite direction and under control of said first-mentioned carriage, a cross slide mounted on said supplemental carriage and having means for supporting a plastic printing plate thereon for cooperation with said dies, line spacing means mounted on said supplemental carriage for imparting line spacing movements to said cross slide, means on said first-mentioned carriage for operating said line spacing means, and means mounted on said supplemental carriage for imparting return movement to said cross slide.

11. In a machine for forming embossed type characters on plastic plates and the like, a typewriter having a carriage shiftable through character spacing movements in one direction and having key controlled type arms movable selectively through operating strokes and having character spacing means for said carriage controlled by said type arms, character forming dies supported on said type arms for forming reverse-reading embossed type characters, a supplemental carriage mounted for movement parallel to said first-mentioned carriage, motion transmitting means connecting the respective carriages to impart character spacing movements to said supplemental carriage in the opposite direction and under control of said first-mentioned carriage, a cross slide mounted on said supplemental carriage and having means for supporting a printing plate thereon for cooperation with said dies, line spacing means mounted on said supplemental carriage for imparting line spacing movements to said cross line, and means mounted on said supplemental carriage for imparting return movement to said cross slide.

12. In a machine for forming embossed type characters on plastic plates and the like, a typewriter having a carriage shiftable through character spacing movements in one direction and having key controlled type arms movable selectively through operating strokes and having character spacing means for said carriage controlled by said type arms, character forming dies supported on said type arms for forming reverse-reading embossed type characters, a supplemental carriage mounted for movement parallel to said first-mentioned carriage, a cross slide on said supplemental carriage for supporting and imparting line spacing and return movements to a plate, motion transmitting means connecting the respective carriages to impart character spacing movements to said supplemental carriage in the opposite direction and under control of said first-mentioned carriage, means mounted in part on each of said carriages for imparting line spacing movements to said cross slide, and means mounted on said supplemental carriage for imparting return movement to said cross slide.

JOHN H. GRUVER.

REFERENCES CITED

The following references are of record in the file of this patent:

UNITED STATES PATENTS

| Number | Name | Date |
| --- | --- | --- |
| 946,824 | Pautze | Jan. 18, 1910 |
| 1,389,237 | Block | Aug. 30, 1921 |